M. JACOBS.
SELF LOCKING NUT.
APPLICATION FILED OCT. 19, 1909. RENEWED AUG. 15, 1912.
1,076,674.
Patented Oct. 28, 1913.
2 SHEETS—SHEET 1.
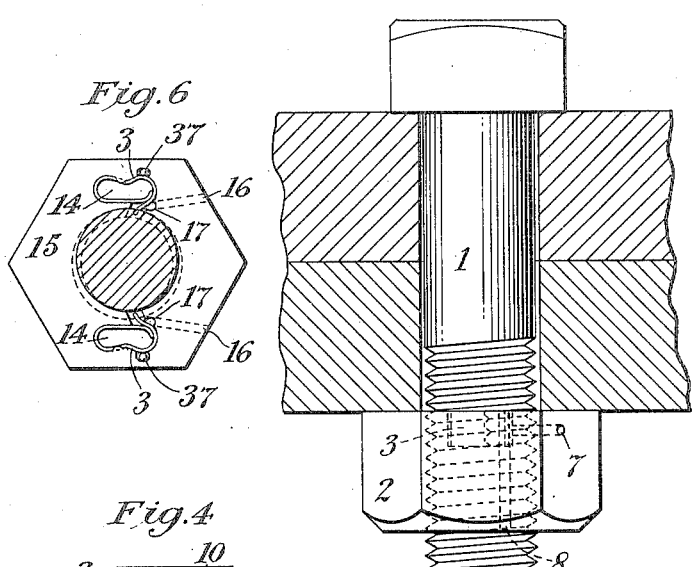
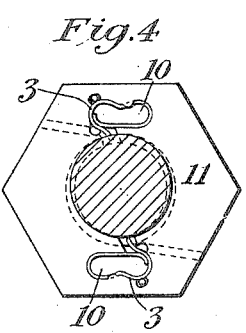
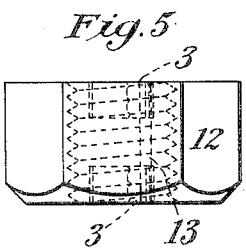
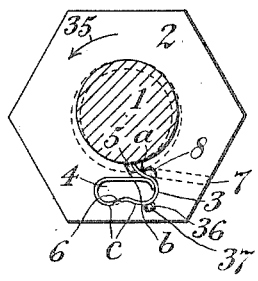
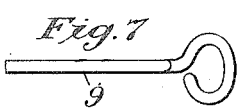
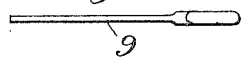
Witnesses:
Inventor
Morris Jacobs
By his Attorney
Henry D. Williams M. JACOBS.
SELF LOCKING NUT.
APPLICATION FILED OCT. 19, 1909. RENEWED AUG. 15, 1912.
1,076,674.
Patented Oct. 28, 1913.
2 SHEETS—SHEET 2.
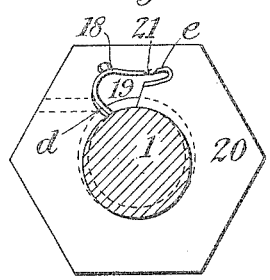
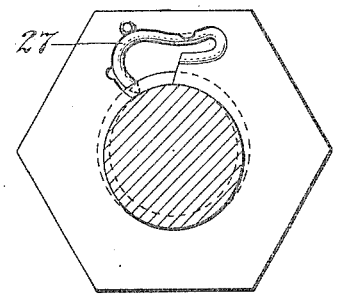
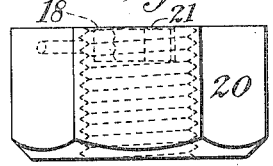
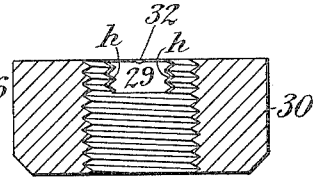
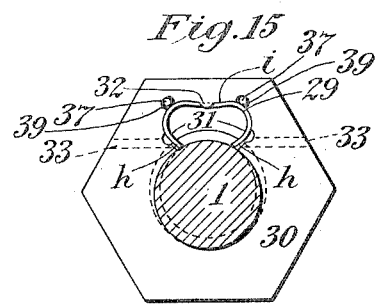
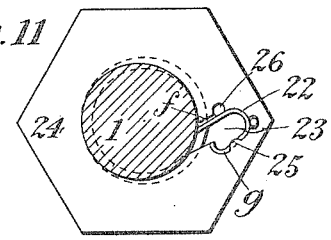
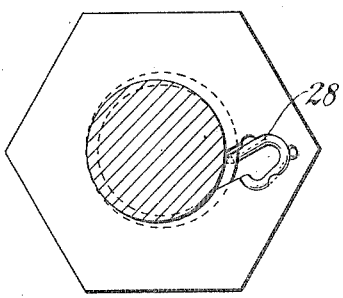
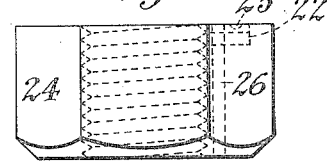
Witnesses:
Wm. Ashley Kelly
Victor D. Borst
Inventor
Morris Jacobs
By his Attorney
Henry D. Williams

UNITED STATES PATENT OFFICE.

MORRIS JACOBS, OF NEW YORK, N. Y.

SELF-LOCKING NUT.

1,076,674. Specification of Letters Patent. Patented Oct. 28, 1913.

Application filed October 19, 1909, Serial No. 523,450. Renewed August 15, 1912. Serial No. 715,307.

*To all whom it may concern:*

Be it known that I, MORRIS JACOBS, a citizen of the United States, residing at the borough of Brooklyn, city of New York, in the county of Kings and State of New York, have invented certain new and useful Improvements in Self-Locking Nuts, of which the following is a specification, reference being had therein to the accompanying drawings, forming part thereof.

My invention relates to means for locking nuts against accidental and unintentional unscrewing, as is liable to occur with serious results by reason of the vibrations and jars attendant with use, particularly, for example, in marine service, on vehicles of all kinds, railroad fish-plates, bridges, agricultural machinery and engines.

My invention has among its objects a simple, effective and inexpensive device employing bolts of ordinary construction, adaptability to variations in size of the bolts, adjustability for wear, non-mutilation of the threads of either the nut or bolt, self-tightening when subjected to vibration, whereby nuts are kept in a tightened condition and will automatically tighten or screw up if inadvertently left loose, convenient unscrewing when desired without injury to any of the parts, prevention of separation and loss of the locking parts, protection of the locking device from the weather, concealment of the locking device so that when the nut is on the bolt the appearance presented is that of any ordinary nut and bolt, and other objects and advantages which will appear from the following description.

My invention employs a spring forming a locking member contained in a recess in the nut. In one form of my invention the locking spring is bent upon itself so that one part of the spring reinforces another part thereof. In this form the locking member comprises a locking tongue which projects beyond a reinforcing tongue for the base portion of the locking tongue, and an intermediate securing portion by which the locking member is more securely held in the nut.

My invention also includes a transversely oblong rounded recess provided with a reduced throat, the securing portion of the locking member being conformed to and fixed in the rounded portion of the recess and the locking tongue projecting through the throat into locking engagement with the threads of the bolt.

My invention also includes means for adjusting the locking member to compensate for wear.

My invention also includes other novel features and combinations of parts hereinafter described.

I shall now describe my invention with reference to the accompanying drawings and shall thereafter point out my invention in claims.

Figure 1 is an elevation partly in section showing the self-locking nut locked on a bolt and coacting with the bolt in clamping two objects together. Fig. 2 is a cross-section through the bolt immediately back of the nut as viewed from the top in Fig. 1. Fig. 2ª is a plan view of a backing pin for the spring locking member. Fig. 2ᵇ is a plan view of an adjusting pin adapted to be substituted for the backing pin. Fig. 3 is a detail of the locking member. Fig. 4 is a view similar to Fig. 2 of a modified construction wherein the locking member is duplicated in a diametrically opposite position. Fig. 5 is an elevation of a nut showing another modification, wherein the locking member is duplicated at opposite ends of the nut. Fig. 6 is a view similar to Figs. 2 and 4 of a further modified construction wherein two locking members of reversed construction are employed for locking the nut against movement on the bolt in either direction. Fig. 7 is a plan view of a flattened rotatable key for unlocking the locking members. Fig. 8 is an edge view of the same. Fig. 9 is a view similar to Fig. 2 of a modification in which the locking member is not reinforced. Fig. 10 is an elevation of the nut shown in Fig. 9 as viewed from the bottom, the bolt being removed. Fig. 11 is a plan view similar to Fig. 9 showing a modification in which the locking member is of a width only sufficient to engage one of the threads of the bolt. Fig. 12 is a view similar to Fig. 10 of what is shown in Fig. 11 and shows the locking member in dotted lines. Fig. 13 is a view similar to Fig. 9 and shows a locking member constructed of wire. Fig. 14 is a view similar to Fig. 13 showing a modification wherein is employed a wire locking member of slightly different construction. Fig. 15 is a view similar to Figs. 2, 4 and 6 of a modification wherein a single double-acting locking member is employed for locking the nut against movement on the bolt in either direction. Fig. 16 is a central horizontal section of Fig. 15 looking upward, the bolt being omitted to expose the double-acting locking member.

In the embodiment of my invention illustrated in Figs. 1 and 2 of the drawings, an ordinary bolt 1 has screwed thereon a self-locking nut 2, provided with a spring locking member 3 contained in an oblong recess 4 extending transversely to the longitudinal axis of the bolt 1 and communicating with the bolt-receiving aperture in the nut, but not extending to the periphery of the nut, and shown as formed in the back face or inner face of the nut 2. The recess 4 has transversely rounded or curved inclosing walls, as shown in the drawings, and is provided with a reduced portion or throat 5 forming the communication with the bolt-receiving aperture in the nut. The spring locking member 3 is a leaf spring and may be conveniently formed from a strip or ribbon of resilient sheet metal. The spring locking member 3 comprises a substantially straight locking tongue $a$, a reinforcing tongue $b$ and an intermediate securing portion $c$, curved to conform to the rounded contour of the walls of the oblong rounded portion of the recess 4. The spring locking member is bent upon itself and forms substantially a closed loop, the locking tongue $a$ and the reinforcing tongue $b$ being shown as extending oppositely into contact one with the other, the bases of these tongues being integrally united by the intermediate securing portion $c$ and the locking tongue projecting at its free end beyond the reinforcing tongue, the end of which is turned within the locking tongue. The respective tongues are united to the intermediate portion by gradual curves, as shown in the drawings. The spring action of the locking member 3 would, under ordinary circumstances, retain it in the recess 4, but as an additional safeguard against loss of the locking member when the nut is tossed about or otherwise roughly handled, the metal of the nut is upset at 6 against the middle securing portion of the locking member, thereby avoiding any possibility of loss of the locking member.

The locking tongue $a$ projects through the throat 5 at a locking angle and resiliently engages the threads of the bolt 1, the angle of engagement being such as to permit free rotation of the nut 2 in a direction indicated by the arrow 35 (Fig. 2), and to form a locking engagement with the threads of the bolt and prevent rotation of the nut in the opposite direction. The locking tongue $a$ is shown as serrated or notched at its end to make a firmer locking engagement with the threads of the bolt. The resilient locking tongue $a$ is supported and strengthened at its back by the curved wall of the recess 4 and at its forward side is reinforced and strengthened by the reinforcing tongue $b$, which also assists in pressing the locking tongue $a$ into firmer locking engagement with the threads of the bolt 1. Because of the resiliency of the locking member and its constant contact with the threads of the bolt, a firm lock of the nut will at all times be maintained and no backward movement of the nut 2 can take place. On the contrary, the jars and vibrations of use will keep the nut tight and will tighten it if left loose. The somewhat irregular oblong shape of the recess 4 securely holds the locking member, and the curved contour of the locking member 3 and the absence of any sharp corners or angular bends augments its springing action and obviates breakage. The resilient nature of the locking member 3 enables the locking tongue $a$ to effectively lock with the threads of the bolt 1, whether the nut 2 fits tightly or loosely on the bolt 1. This is a very important advantage because of the variations in the actual dimensions of the threaded portions of bolts and nuts supposed to be of the same size as found on the market.

Means are provided for taking up wear of the locking end of the locking tongue $a$ of the locking member 3. A hole 36 is provided back of the securing portion $c$ and near to the base of the locking tongue $a$ and receives a backing pin 37, which is driven therein in contact with the spring member 3, the hole 36 being of larger diameter than the backing pin 37 and cutting into the recess 4, the backing pin 37 coacting with the walls of the recess in supporting the locking member 3. When the locking end of the locking tongue $a$ becomes worn so as not to make a firm locking engagement with the screw threads of the bolt 1, the tongue $a$ may be forced farther inward toward the bolt by substituting for the backing pin 37 an adjusting pin 38 of larger diameter which will more nearly fill the hole 36 and will force a portion of the securing portion $c$ away from the back wall of the recess 4 and thereby compel the locking tongue $a$ to project farther from the throat 5 and bring such worn tongue again into firm locking engagement with the screw threads of the bolt 1, the adjusting pin 38 being shown as tapered at one end to facilitate the starting of such pin into the hole 36.

When it is desired to unscrew the nut 2, it is necessary to hold the locking tongue $a$ out of contact with the threads of the bolt 1. For this purpose two small holes 7 and 8 are provided, hole 7 being in the side of the nut and entering the recess 4 back of the locking tongue $a$, and the hole 8 extending substantially parallel with the longitudinal axis of the bolt 1 and taking away a portion of the wall of the recess 4 back of the locking tongue *a* of less depth than the diameter of the hole 8. Either of these holes may be used according to which is accessible or most convenient, depending upon the location or position of the nut. When the hole 7 is used, any sufficiently small implement may be inserted to push back the locking tongue *a*. When the hole 8 is used, a flattened releasing key 9 (Figs. 7 and 8) is inserted therein and passes to the rear of the locking tongue *a*, the locking tongue being pressed away from locking engagement by rotating the key 9.

When the nut is on the bolt the appearance presented is substantially the same as that of an ordinary nut and bolt, the locking member being hidden from view and secure from injury and tampering, and by its location at the back of the nut is well protected from moisture and liability to rust.

In the modification illustrated in Fig. 4, duplicate spring locking members 3 are provided and located in diametrically opposite duplicate recesses 10 in a nut 11, the locking members 3 being duplicates each of the other and also being duplicates of the locking members shown in Figs. 1, 2 and 3. With the exception of the duplication of locking members, the construction of Fig. 4 is identical with that of Figs. 1 and 2. In some situations a plurality of locking members in a single nut may be desirable for the purpose of securing increased locking strength.

In the modification illustrated in Fig. 5, spring locking members 3 are duplicated at opposite end faces of a nut 12, that is, in a direction longitudinal to the axis of the nut and the bolt. A hole 13, corresponding to the hole 8 of Figs. 1 and 2, is provided substantially parallel with the bolt-receiving aperture of the nut and in which the rotatable key 9 may be inserted to effect a simultaneous unlocking of the locking members 3, no side holes corresponding to hole 7 of Figs. 1 and 2 being provided in the nut 12. With the exceptions noted, the construction and operation are the same as described in reference to Figs. 1 and 2.

In the modification illustrated in Fig. 6, reversely arranged spring locking members 3 are located in diametrically opposite reversely formed recesses 14 in a nut 15. The two spring locking members 3 are identical with those hereinbefore described, but are relatively reversed end to end and side to side, so that one of the members in the nut 15 locks this nut against rotation in one direction and the other locking member 3 locks such nut against rotation in the opposite direction. In some situations of use it is desirable to lock the nut against movement on the screw threads of the bolt in either direction. When the nut is to be adjusted, the spring locking members may be released by releasing keys inserted through the side holes 16 or end holes 17 in the nut 15. Adjustment of the nut to different positions on the bolt may cause wear of the locking members and compensation may be made for such wear by substituting the adjusting pin 38 for the backing pin 37, as explained in reference to Figs. 1 and 2.

The modification illustrated in Figs. 9 and 10 differs chiefly from the construction described with reference to Figs. 1 and 2 in that the locking member is not reinforced, that is to say, the reinforcing tongue is omitted. Such locking member 18 comprises a substantially straight resilient locking tongue *d* and a bent securing portion *e*, which is shown as turned in a reverse direction. The locking member 18 is made of a bent ribbon of metal similar to that employed in making the locking members 3 hereinbefore described, but the locking member 18 is of a different shape from the reinforced locking members 3 and is contained in a correspondingly shaped recess 19 formed in a nut 20. The metal of the nut is upset at 21 against the securing portion *e* to securely hold the locking member 18 in the recess 19. The locking tongue *d* is adapted to have locking engagement with the screw threads of the ordinary bolt 1 in substantially a similar manner to the locking tongue *a* of the locking member 3.

In the modification illustrated in Figs. 11 and 12, a spring locking member 22 of the non-reinforced type is employed and this construction is distinguished chiefly by the fact that the locking member is of less width than those hereinbefore described and of a width sufficient to engage one thread only of the bolt 1, the narrow width of the locking member 22 being indicated in dotted lines in Fig. 12. The locking member 22 is of somewhat different shape from the locking member 18 of Figs. 9 and 10 and is contained in a recess 23 of corresponding shape formed in the nut 24. The locking member 22 comprises a substantially straight resilient tongue *f*, and a bent securing shank *g*, over which the metal of the nut is upset at 25. A longitudinal aperture 26 is provided for the insertion of a rotatable releasing key, such as 9 (Figs. 7 and 8), for pushing the locking tongue *f* to unlocked position.

The modification illustrated in Fig. 13 differs chiefly from those described in reference to Figs. 9 to 12, inclusive, in that the spring locking member is formed of cylindrical wire. This locking member 27 is bent to about the same shape as the locking member 18 (Fig. 9) and the end of the locking member which engages the screw threads of the bolt is pointed, as shown.

In the modification shown in Fig. 14 a wire locking member 28 is provided of a shape substantially similar to that of the flattened locking member 22 (Figs. 11 and 12).

In the modification illustrated in Figs. 15 and 16, a construction is shown in which a single spring locking member 29 is adapted to lock a nut 30 against rotation in either direction on the ordinary bolt 1. In this respect the single locking member 29 performs the function of the two reversely arranged locking members shown in Fig. 6. The locking member 29 is contained in a transversely oblong recess 31 of substantially the same general shape as the recess 4 (Fig. 2) and communicating at one of its sides with the bolt-receiving aperture of the nut 30. The locking member 29 comprises two oppositely inclined spring locking tongues $h$ and an intermediate securing portion $i$ upon which the metal of the nut 30 is upset at 32 to more firmly hold the locking member in place. The spring locking tongues $h$ are braced by the walls of the recess 31 and the opposite inclinations of these tongues, combined with their resilient action, effectively locks the nut against movement in either direction. Side holes 33 are provided in the nut for the insertion of releasing implements and also longitudinal holes 34 are provided for the use of rotatable keys, such as 9 of Figs. 7 and 8. Adjustment to compensate for wear of the locking tongues $h$ may be effected by removing the backing pins 37 and driving larger adjusting pins such as 38 into holes 39 back of the free portions of the retaining portion $i$ of the double-acting spring locking member 29.

All of the several kinds of locking members, except, of course, those which lock in both directions, are of the self-tightening variety, that is, when subjected to vibrations they tend to keep the nut tight and to tighten it if loose. However, if desired, the self-tightening function may be dispensed with by giving a strong tension to the spring locking member.

With all of the spring locking members the self-adjustment due to their springing action enables the self-locking nuts to be effectively used, whether the nuts fit tightly or loosely on the bolts, no exactness of fit of nut and bolt being required for the successful operation of the locking devices. This fact is of material advantage as enabling the use of ordinary inexpensive stock bolts, which are not exact and accurate as to diameter in their threaded portions, and which could not be reliably used unless the locking device contained this compensating feature.

The manufacture is very inexpensive. The recesses at the faces of the nuts may be indented therein at the time of the stamping out of the nut blanks and the small holes may be readily drilled.

It is obvious that various modifications may be made in the constructions shown and above particularly described within the principle and scope of my invention.

I claim:

1. An integral locking member for screw-threaded nuts comprising a locking tongue adapted to engage the threads of a bolt, and a reinforcing tongue adapted to engage the base portion only of the locking tongue, the locking tongue projecting a substantial distance beyond the reinforcing tongue.

2. A locking member for screw-threaded nuts comprising a locking tongue, a reinforcing tongue extending in an opposite direction to the locking tongue contiguous thereto, and an intermediate portion uniting the bases of the said tongues.

3. The combination with a screw-threaded bolt, of a screw-threaded nut having provided therein a recess having an enlarged transversely oblong rounded portion with continuously curved side walls throughout, such recess also having a reduced throat portion forming a communication between the rounded oblong portion of the recess and the bolt receiving aperture of the nut, and a spring locking member having a securing portion conformed to the rounded contour of the side walls of the oblong rounded portion of the recess and following the contour of such side walls substantially throughout the length of such side walls and fixed in place in the recess, the locking member also having an end portion projecting through the throat of the recess and forming a spring locking tongue adapted to have locking engagement with the screw threads of the bolt.

4. The combination, with a screw-threaded bolt, of a screw-threaded nut having a recess provided therein communicating with the bolt-receiving aperture, a spring locking member in the recess having a locking portion adapted to engage the screw threads of the bolt, the nut being provided with a hole back of the locking member communicating with the recess, and a pin adapted to be driven into the hole to push the locking member toward the bolt-receiving aperture and thereby cause a firmer engagement of the locking portion with the screw threads of the bolt.

In testimony whereof I have affixed my signature in presence of two witnesses.

MORRIS JACOBS.

Witnesses:
WM. ASHLEY KELLY,
BERNARD COWEN.